E. W. KELLEY.
Clutches.

No. 153,199.  Patented July 21, 1874.

2 Sheets--Sheet 1.

Witnesses:
George E. Phelps.
James Sullivan

Inventor:
Edward W. Kelley
by Alban Andrén, atty.

2 Sheets--Sheet 2.

E. W. KELLEY.
Clutches.

No. 153,199. Patented July 21, 1874.

Witnesses:
George E. Phelps.
James Sullivan

Inventor:
Edward W. Kelley
by Alban Andrew, atty.

UNITED STATES PATENT OFFICE.

EDWARD W. KELLEY, OF LOWELL, MASSACHUSETTS.

IMPROVEMENT IN CLUTCHES.

Specification forming part of Letters Patent No. 153,199, dated July 21, 1874; application filed January 8, 1874.

*To all whom it may concern:*

Be it known that I, EDWARD WATSON KELLEY, of Lowell, in the county of Middlesex and State of Massachusetts, have invented certain new and useful Improvements in Clutches for Machinery; and I do hereby declare the following to be a full, clear, and exact description of the invention, such as will enable others skilled in the art to which it pertains to make and use it, reference being had to the accompanying drawings, which form part of this specification.

My invention relates to improvements on clutches for shaftings, for the purpose of connecting and disconnecting a wheel or pulley to and from the shaft, or for the purpose of connecting or disconnecting couplings to and from each other, or for any other purpose where a clutch may be advantageously employed.

My invention consists of a block secured to the shaft, and rotates with the latter, in combination with a suitable cam-wheel loose on the shaft, and provided with a number of locking-bolts, that project through perforations in the aforesaid block, and enter into corresponding recesses on the hub of the pulley, wheel, or coupling that is to be connected to the revolving shaft.

The cam-wheel is operated by means of a suitable lever, and the locking-bolts aforesaid are brought in contact with the recesses on the hub of the wheel or pulley by means of coiled springs, or their equivalents.

Figure 1:
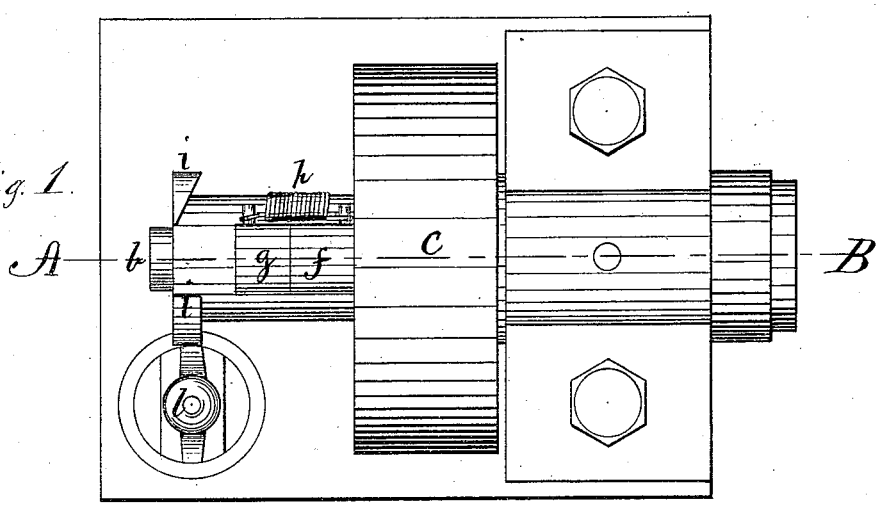
Figure 2:
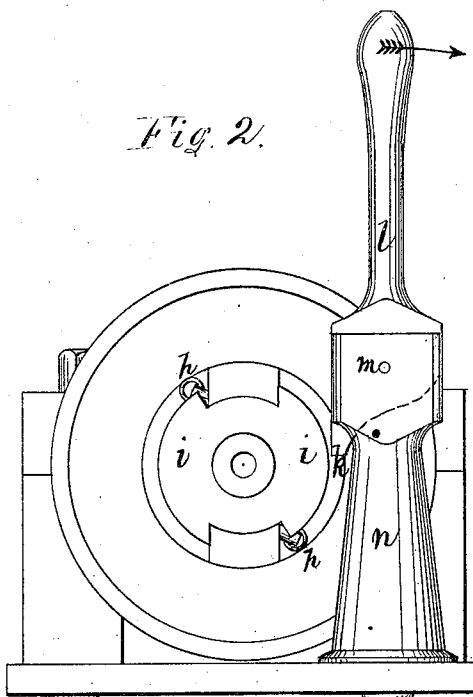
Figure 3:
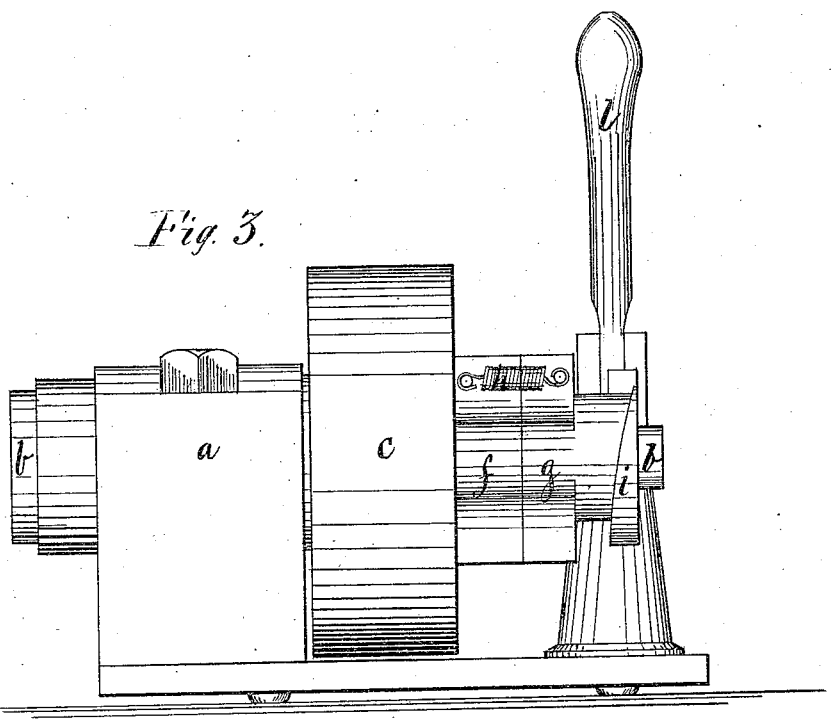
Figure 4:
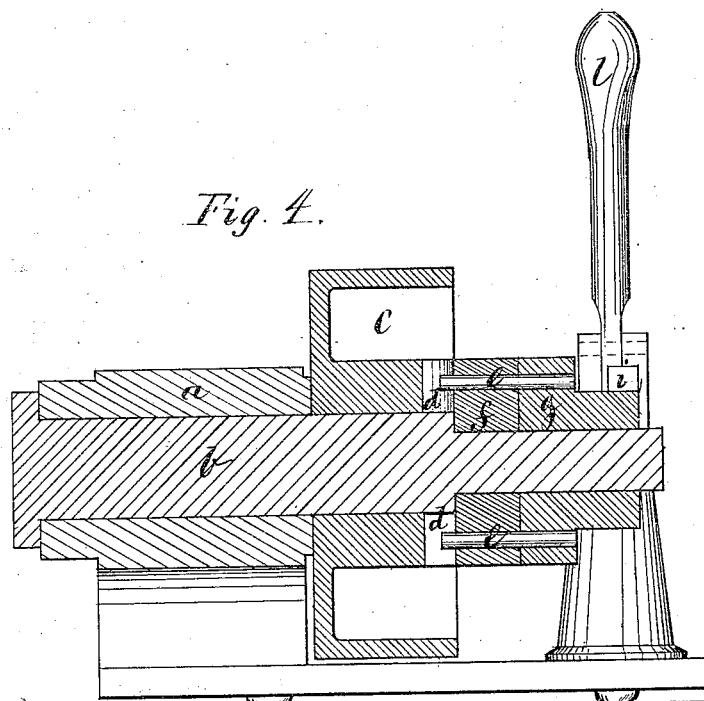

On the drawings, Figure 1 represents a ground plan. Fig. 2 represents an end elevation. Fig. 3 represents a side elevation; and Fig. 4 represents a longitudinal section on the line A B, (shown in Fig. 1.)

Similar letters refer to similar parts wherever they occur on the different parts of the drawings.

On the drawings, $a$ represents an ordinary bearing, and $b$ represents a shaft revolving therein, in the usual manner. $c$ is a drum, pulley, wheel, or coupling, loose on the shaft $b$, and provided with suitable recesses $d\ d$, in which the ends of the locking-bolts $e\ e$ engage. $f$ is a block, secured firmly to the shaft $b$, and perforated with holes, so as to allow the locking-bolts $e\ e$ to play therein. The bolts $e\ e$ are secured to a hub, $g$, that is made to move loosely in a lateral direction on the shaft $b$. Springs $h\ h$ tend to force the hub $g$ toward the block $f$, and the bolts $e\ e$ into the recesses $d\ d$ on the pulley $c$. The outer end of the hub $g$ is provided with suitable cams $i\ i$, that engage with a projection, $k$, on lever $l$, being the lower end of the lever $l$, that is made to swing around a fulcrum, $m$, in the standard $n$.

The operation of my improved clutch is as follows: The drum, pulley, wheel, or coupling $c$ is made to revolve with the shaft $b$, when the different parts of the clutch are in the positions as shown in the drawings, the locking-bolts $e\ e$ being then placed in the recesses $d\ d$ on the hub of the drum $c$. To disengage the bolts $e\ e$ from the above-named recesses, and consequently detach the pulley $c$ from the rotating shaft $b$, it is only necessary to move the upper end of the lever $l$ slightly in the direction of the arrow shown in Fig. 2, when the projection $k$ thereof engages with one of the inclined cams $i\ i$, by which operation the hub $g$, as well as its bolts $e\ e$, is moved laterally on the shaft $b$ from the block $f$, and the recesses $d\ d$ on the pulley $c$.

When I wish to connect the pulley $c$ to the rotating shaft $b$, I simply move the lever $l$ to its original position, whereby the projection $k$ is disengaged from the cams $i\ i$, and the bolts $e\ e$ forced into the recesses $d\ d$ by the action of the spiral springs $h\ h$.

What I wish to secure by Letters Patent, and claim, is—

In combination with a shaft, $b$, and its firmly-secured block $f$, the hub $g$, locking-bolts $e\ e$, recesses $d\ d$ in the wheel, pulley, drum, or coupling $c$, the springs $h\ h$, and the operating-lever $k\ l$, as and for the purpose set forth and described.

In testimony that I claim the foregoing I have hereunto set my hand this 1st day of December, 1873.

EDWARD WATSON KELLEY.

Witnesses:
ALBAN ANDRÉN,
GEORGE E. PHELPS.